3,798,278
PROCESS OF PRODUCING ALCOHOLS
Herbert August Jung, New York, N.Y., assignor to Esso Research and Engineering Company
No Drawing. Filed Aug. 9, 1971, Ser. No. 170,360
Claims priority, application Great Britain, Aug. 17, 1970, 39,498/70
Int. Cl. C07c 33/02, 69/80
U.S. Cl. 260—638 R          10 Claims

ABSTRACT OF THE DISCLOSURE

A process for the preparation of unsaturated higher alcohols from conjugated dienes and aldehydes by contacting said dienes and aldehydes in the presence of a salt or chelate or coordination compound of palladium or platinum and a ligand of the type $YR_3$ wherein Y is phosphorus or arsenic and R is a hydrocarbyl radical characterized as being more bulky in proximity to Y than a straight chain alkyl radical or an unsubstituted aromatic ring.

---

This invention relates to the production of unsaturated higher alcohols from conjugated dienes and aldehydes. More specifically this invention relates to a process where in substantially unsaturated higher alcohols are produced.

According to the present invention unsaturated higher alcohols of variable chain length, as well as other oxygenated products are produced by a process which comprises contacting a conjugated diolefin with an aldehyde in the presence of a salt or chelate or coordination compound of Pd or Pt and, if the ligand is not already present in the coordination compound, a ligand of the type $YR_3$, wherein Y is phosphorous or arsenic and R is an alkyl group with 1–12 carbon atoms or an aryl or arylalkyl group with an equivalent or higher amount of carbon atoms.

The conjugated diolefin contains one or more groupings

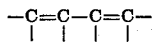

in which the residual valencies on the carbon atoms may be satisfied by hydrogen atoms or hydrocarbon residues or other substituents.

The hydrocarbon residues may comprise aliphatic or aromatic groups and the other substituents may be of inorganic nature, such as halogen atoms. The preferred example of such a conjugated diolefin is butadiene.

Salts or chelates or coordination compounds of Pd or Pt have been found to be effective catalysts for the reaction in question. The coordination compounds of these metals are based on complexes formed with ligands of the type $YR_3$, wherein Y is a Group V element, preferably phosphorus, and R is a hydrocarbyl group, preferably an alkyl or alicyclic group with 1 to 12 carbon atoms or an aryl or arylalkyl group with an equivalent or higher amount of carbon atoms. Such compounds can be preformed or caused to be formed in situ.

In the copending U.S. application Ser. No. 112,777, filed Feb. 4, 1971, in the names of Herbert A. Jung and Hubert H. Lammens, it has been described that the main products from the reaction of conjugated diolefins with aldehydes in the presence of coordination compounds of palladium or platinum with simple straight chain aliphatic or aromatic phosphines, are dialkenyl substituted cyclic ethers.

It has now been found that the structure of the substituents on the phosphines has a decisive effect on the direction the reaction is going to take. If for instance in the reaction of butadiene with formaldehyde triphenyl phosphine or tri-n-butyl phosphine is replaced by e.g. an alpha-branched phosphine, what was originally substantially a cyclo-co-trimerization reaction to yield divinyl-tetrahydropyrans will now become an open chain co-trimerization yielding mainly unsaturated $C_9$-alcohols which for their greater part can be characterized as 2-ethylheptanol precursors.

This surprising effect is demonstrated by the fact that by changing from tri-n-butylphosphine to tri-isopropyl phosphine and to tri-cyclohexyl phosphine as coordinating ligands on the palladium in the butadiene-formaldehyde cotrimerization, the ratio of unsaturated $C_9$-alcohols versus divinyl-tetrahydropyrans is changed from 0.01 to 2 to 15, which means in other words, that in the last case the formation of the divinyl tetrahydropyrans is substantially suppressed in favour of the more desirable formation of unsaturated $C_9$-alcohols.

The phosphines and arsines which are effective in the cotrimerization of conjugated dienes and aldehydes as defined hereinbefore to form preferentially unsaturated alcohols are those which are more bulky than straight chain alkyl phosphines or arsines.

The term bulky is used in the sense that the R-groups, which need not be equal, have such a structure that a relatively large number of atoms is surrounding the central atom, phosphorus and arsenic that is, compared with an alkyl substituted atom. The effective phosphines or arsines can be distinguished in the following way according to the nature of the substituents:

(1) Alkyl substituents which are branched close to the phosphine or arsine, preferably in alpha- or beta-position; they may have one or more branchings, like e.g. isopropyl, sec. butyl, tert-butyl, neopentyl.

(2) Cycloaliphatic substituents, the rings being made up from 3 to 12 carbons, like e.g. cyclohexyl, cyclopentyl or cycloheptyl.

(3) Bicyclic substituents and tricyclic substituents, each ring being made up from 3 to 12 carbons, like octahydronaphthyl or indanyl or norbornyl. These bicyclic substituents may be unsaturated or even partially aromatic, like dicyclopentadienyl or tetrahydronaphthyl.

(4) Aromatic substituents which are substituted in ortho, less preferably in meta-position, either by normal alkyl substituents or by any of the substituents mentioned under 1, 2 and 3 above.

(5) Any mixture of substituents cited under 1, 2, 3 and 4 as well as their mixture with simple unbranched alkyl substituents.

(6) All substituents cited may themselves be substituted in that manner that their hydrogen atoms may partially be replaced by heteroatoms which will not, or at least not strongly coordinate with palladium or platinum e.g. such as halogens; or their hydrogen atoms may be partially replaced by alkoxy groups.

Among the cited metal compounds, salts of palladium or coordination complexes of salts or even Pd(O) complexes formed with the above mentioned phosphines are preferred. The salts or chelates can be introduced into the reaction vessel together with the specific ligand with the advantage that no preformation of the coordination compound is necessary.

Particularly effective are palladium acetate and acetylacetonate in combination with the cited phosphines. The molar ratio of the metal to the ligands can be between 0.2 and 10, preferably between 1 to 5, a suitable value being 1.

The concentration in the reaction mixture of the salt or chelate or coordinated compound of the Pd or Pt metal preferably lies within the range 0.00001 to 0.05 molar, more preferably 0.001 to 0.02 molar.

The aldehydes used in the process are preferably of the aliphatic type containing 1 to 12 carbon atoms but substituted aliphatic aldehydes and aromatic aldehydes may be used as well. Preferred are the lower aliphatic aldehydes and most preferred is formaldehyde or a compound releasing formaldehyde during the reaction. The reaction may be carried out in the presence of water. The molar ratio of conjugated diene to aldehyde is broadly within the range of 0.5:1 to 10:1, preferably 2:1 to 8:1. The process according to the invention is carried out at a temperature with the range of −30 to 200° C., preferably with the range of 0 to 150° C., and more preferably within the range of 40 to 120° C.

The reaction is preferably carried out in the liquid phase. Also the process can advantageously be carried out in the presence of one or more solvents. Particularly in the case of formaldehyde, its solution in water, to which a further solvent, e.g., tetrahydrofuran can be added, is useful. Also cyclic ethers can be used as solvents and alcohols.

The process according to the invention yields primary and secondary alcohols with carbon numbers equal to the sum of those present in two moles of the conjugated diolefin plus one mole of the aldehyde. As minor by-products cyclic ethers, diolefin dimers and lower than C₉-alcohols as well as some other oxygenated products are also obtained under certain conditions.

Among the alcohols which are produced in the reaction where butadiene serves as a diolefin and formaldehyde as the aldehyde, the most prominent have the following structure or are stereo or double bond isomers of compounds represented by these structures:

$$CH_2=CH-CH-CH_2-CH_2-CH_2-CH=CH_2$$
$$\quad\quad\quad |$$
$$\quad\quad\quad CH_2-OH$$

2-vinyl-6-heptenol and its isomer 2-vinyl-5-heptenol
and $$CH_2=CH-CH-CH_2-CH=CH-CH=CH_2$$
$$\quad\quad\quad |$$
$$\quad\quad\quad CH_2-OH$$

2-vinyl-4.6-heptadienol

In the cases where others of the above cited diolefins and aldehydes are used, primary and secondary alcohols are formed which have structures which can be derived from the formulas above by substituting any one of the hydrogens on a carbon by residues R, representing alkyl groups, aromatic radicals or other substituents, such as for example halogens and other heteroatoms:

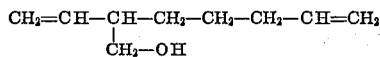
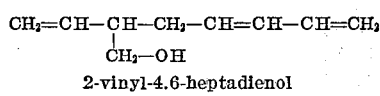

Stereo and double bond isomers of these compounds are also obtained. The by-products are cyclic ethers of the dialkyltetrahydropyran type as well as dimers of the diolefins employed.

The hydrogenation of the unsaturated alcohols over transition metal catalyts will lead to saturated alcohols, alcohols which are particularly interesting as plasticizer alcohols to replace 2-ethylhexanol.

EXAMPLE 1

0.032 g. (0.15 mmole) palladium acetate and 0.214 g. (0.75 mmole) tricyclohexylphosphine, 42.5 g. of a 35% foraldehyde water solution (0.5 mole) and 165.5 g. (3.06 moles) butadiene were placed into a 1 liter autoclave.

The mixture was vigorously stirred and heated to 85° C. for 6 hours. After cooling to room temperature the unreacted butadiene was vented. 81% of the formaldehyde was converted. The reaction product separated into two phases afted distillation, the organic phase was shown to contain 70% unsaturated C₉ alcohols. The alcohols were accompanied by 2.5% di-vinyl-tetrahydropyran and 17% 1.3.7.-octatriene as well as small amounts of other butadiene dimers, also some higher unsaturated aldehydes were detected. The unsaturated C₉-alcohols were identified and some of them characterized with the help of nuclear spectroscopy.

Upon hydrogenation over platinum oxide on carbon the unsaturated C₉ alcohols gave almost exclusively 2-ethylheptanol. From the spectroscopic data it was concluded that the major part of the alcohols have the following structures or are stereo and double bond isomers of compounds represented by the following structures.

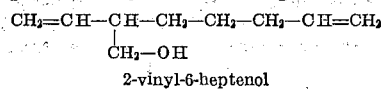

2-vinyl-6-heptenol and

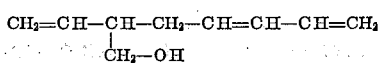

2-vinyl-4.6-heptadienol

EXAMPLE 2

0.34 g. (1.5 mmoles) palladium acetate, 2.16 g. (7.5 mmoles) tricyclohexylphosphine, 42.5 g. of a 35% formaldehyde water solution (0.5 mole) and 165 g. (3.05 moles) butadiene were placed into a 1 liter autoclave together with 100 ml. tetrahydrofuran. The mixture was vigorously stirred and heated to 85° C. for 1 hour. After cooling to room temperature the unreacted butadiene was vented and tetrahydrofuran was distilled off. 96.5% of the formaldehyde had been converted. By G.L.C. analysis the product was found to consist of 58% of the same unsaturated C₉-alcohols as in Example 1, 5.5% divinyl-tetrahydropyran and 20% of butadiene dimers.

EXAMPLE 3

0.34 g. (1.5 mmoles) palladium acetate, 1.22 g. (7.5 mmoles) tri-isopropyl phosphine, 42.5 g. of a 35% formaldehyde water solution (0.5 mole) and 167 g. (3.1 moles) butadiene were charged to a one liter autoclave stirred and heated to 85° C. for 1 hour. A 92% formaldehyde conversion was found. After an identical work-up as in Example 1, 40% of the same unsaturated C₉ alcohols as in Example 1, 19% of divinyltetrahydropyran and 30% of butadiene dimers were found in the distillate.

EXAMPLE 4

0.34 g. (1.5 mmoles) palladiumacetate, 2.28 g. (7.5 mmoles) tri-o-tolylphosphine, 42.5 g. of a 35% formaldehyde water solution (0.5 mole) and 165 g. (3.06 moles) butadiene were placed into a one liter autoclave. This mixture was heavily stirred and heated to 85° C. for one hour. A practically quantitative conversion of formaldehyde was found.

After identical workup as in Example 1 27.1% unsaturated C₉-alcohols, 2.9% divinyl-tetrahydropyran as well as 16.7% butadiene dimers were found in the distillate. About 50% of the reaction product consisted of a methanol soluble polymeric material which appeared to be identical with a product obtained by radical polymerization of the unsaturated C₉-alcohols.

EXAMPLE 5

0.34 g. (1.5 mmoles) palladiumacetate, 0.3 g. (1.5 mmoles) tri-iso-butylphosphine, 42.5 g. of a 35% formaldehyde water solution (0.5 mole) and 162 g. (3 moles) butadiene were placed into a one liter autoclave. The mixture was heavily stirred and heated to 85° C. for 40 minutes. About 80% of the formaldehyde had been converted.

The product was worked up as usual. 49.7% of unsaturated C₉-alcohol along with 0.9% of an unsaturated C₉-aldehyde were found in the organic product together with 5.3% divinyl tetrahydropyran and 3.8% 1.3.7-octatriene.

EXAMPLE 6

The reaction as described in Example 2 was repeated but the amount of tricyclohexyl phosphine was reduced to 1.5 mmoles, palladium acetate was replaced by palladium acetylacetonate and tetrahydrofuran by dioxane.

Under these changed conditions the conversion was rather low, 4.3%, but with 91.5% a very high selectivity to unsaturated $C_9$-alcohol was obtained.

EXAMPLE 7

0.11 g. (0.5 mmoles) palladium acetate, 0.43 g. (1.5 mmoles) tricyclohexylphosphine, 14.1 g. (0.16 mole) of a 35% formaldehyde water solution and 64.8 g. (0.95 moles) of isoprene were charged to a 300 cc. autoclave. The mixture was vigorously stirred and heated to 85° C. for 3 hours.

From the resulting two phase product mixture isoprene was distilled off after the water layer had been separated. 16.4 g. of organic product was thus found after isoprene removal and flash distilled to give a distillate containing among other hydrocarbons and oxygenated products 54% of unsaturated $C_{11}$-alcohols.

What I claim is:

1. A process for the preparation of primary or secondary unsaturated alcohols, wherein a conjugated diolefin selected from the group consisting of butadiene and isoprene is contacted with an aldehyde selected from the group consisting of unsubstituted saturated aliphatic aldehydes containing from 1 to 12 carbon atoms, in the presence of a metal compound selected from the group consisting of palladium acetate and palladium acetylacetonate, and a ligand of the type $YR_3$, wherein Y is selected from the group consisting of phosphorus and arsenic and R is selected from the group consisting of isopropyl, isobutyl, cycloaliphatic substituents having from 3 to 12 carbon atoms, and bicyclic and tricyclic substituents having from 3 to 12 carbons in each ring said contacting being conducted at a temperature of from —30 to 200° C.

2. The process of claim 1 wherein said contacting takes place in a solvent selected from the group consisting of water, tetrahydrofuran and mixtures thereof.

3. The process of claim 2 wherein said contacting takes place at a temperature of from 0 to 150° C.

4. The process of claim 1 wherein the ligand contains one or more cycloaliphatic substituents.

5. The process of claim 3 wherein the molar ratio of the metal to the ligand is between 0.2 and 10, the concentration of the palladium acetate or palladium acetylacetonate is in the range of 0.000001 to 0.05 molar and the reaction temperature is within the range of —30 to 200° C.

6. The process of claim 5 wherein the molar ratio of the metal to the ligand is from 1 to 5.

7. The process of claim 3 wherein the conjugated diolefin is 1,3-butadiene and the aldehyde is formaldehyde.

8. The process of claim 7 wherein said contacting is conducted at a temperature of from 40 to 120° C.

9. The process of claim 7 wherein the molar ratio of conjugated diolefin to aldehyde is within the range of 0.5:1 to 10:1.

10. The process of claim 3 wherein said ligand is selected from the group consisting of triisopropylphosphine, tri-isobutylphosphine and tri-cyclohexylphosphine.

References Cited

UNITED STATES PATENTS

| | | | |
|---|---|---|---|
| 3,081,357 | 3/1963 | Alderson et al. | 260—638 R |
| 3,534,088 | 10/1970 | Bryant et al. | 260—638 R |
| 2,308,192 | 1/1943 | Mikeska et al. | 260—638 R |
| 3,414,588 | 12/1968 | Jones | 260—638 R |
| 3,198,841 | 8/1965 | Kochi | 260—630 R |
| 2,335,027 | 11/1943 | Ritter | 260—638 R |
| 3,407,224 | 10/1968 | Smutny | 260—638 R |
| 3,414,588 | 12/1968 | Jones | 260—638 R |

JOSEPH E. EVANS, Primary Examiner

U.S. Cl. X.R.

260—345.1, 475 R, 618 R, 638 R, 633, 642, 683.15 D